Patented May 3, 1932

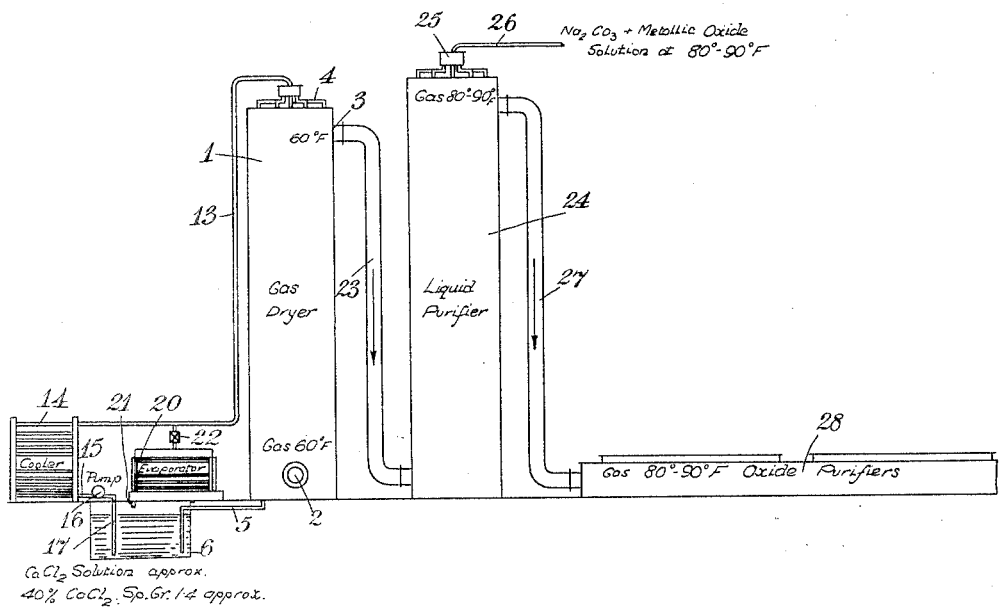

1,856,301

UNITED STATES PATENT OFFICE

SYDNEY GRANGE WATSON, OF SURBITON, AND DANIEL MAYON HENSHAW, OF HUDDERSFIELD, ENGLAND, ASSIGNORS TO W. C. HOLMES AND COMPANY, LIMITED, OF HUDDERSFIELD, YORKSHIRE, ENGLAND

REMOVAL OF SULPHUR FROM FUEL GASES

Application filed February 6, 1930, Serial No. 426,436, and in Great Britain October 15, 1929.

This invention relates to the treatment of fuel gases such as coal gas or town's gas in order to effect the removal of sulphur therefrom by means of reagents employed in association with water, for instance, suspensions or solutions of metallic oxides in alkalis.

It is found in effecting the removal of sulphur from fuel gases in this way, employing for example iron oxide, nickel oxide or similar oxides in suspension, combination, or in solution in a solution of sodium carbonate, that it is desirable to carry out the treatment at temperatures in the neighbourhood of 35° to 40° C.

This would suggest that the crude fuel gases, while still in a heated condition, might well be subjected to the action of such reagents for the removal of the sulphur. However, as such fuel gases may be saturated or supersaturated with water at the temperature at which they are brought into contact with the reagents or will be cooled in contact with such reagents to a temperature at which they will be saturated or supersaturated with moisture, dilution of the reagents will result owing to the separation of water from the gases.

Normally, cooling of the fuel gases is resorted to for the purpose of separating the greater proportion of the contained water therefrom but cooling can only result in producing cooled fuel gas which is saturated with moisture and consequently unless such cooling is carried out to a degree such that at a temperature of 35° to 40° C. the gas will not be fully saturated with moisture, separation of water from the gas, when in contact with the reagent, will take place. On the other hand, if cooling to a greater degree is carried out re-heating of the gas in order to raise it to a suitable temperature to promote the reaction between the sulphur compounds and the reagent is desirable.

The object of the present invention is to provide improvements in the removal of sulphur from fuel gases by the employment of reagents in association with water in the form, for instance, of suspensions or solutions.

The invention consists, broadly, in subjecting hot fuel gases to the action of hygroscopic or water-absorbing bodies in conditions such that the temperature of the gas is not reduced materially below that at which the reaction between the sulphur compounds in the gas and the reagent proceeds satisfactorily.

Thus, in accordance with the invention, fuel gases may be subjected to the action of hygroscopic or water-absorbing bodies in such conditions that the temperature of the gas will not be reduced to materially below 35° to 40° C.

By treatment with such alkaline liquid sulphur removing reagents a considerable proportion of the sulphur may be removed from the fuel gas and subsequently in accordance with the invention the fuel gas may be further treated with dry iron oxide under conditions in which cooling may result.

Preferably, the degree of removal of moisture from the gas subjected to treatment to effect the removal of sulphur is such as to preclude also or minimize the separation of water in the purifiers containing the dry iron oxide.

Conveniently, in accordance with the invention, hygroscopic or water-absorbing bodies in a liquid state are employed, such bodies being, after contact with the gas, subjected to treatment in order to expel from them the water taken up and thereby restore them into a condition in which they may be again used as a drying agent for the fuel gas.

Where the purified gas is further subjected to treatment in order to reduce its moisture content to such a degree that separation of water in the gas mains will be prevented or to secure that on the average the dew point of the gas is such that any moisture separating due to cooling will subsequently be evaporated, or to the reduction of the moisture content to a degree which will render a further removal of moisture by other means commercially practicable or economical, the water-absorbing or hygroscopic bodies used in reducing the moisture content of the gas before it is brought into association with the liquid reagents may be the hygroscopic or water-absorbing material which has already been used in the removal of moisture from gas previously treated to effect a reduction in its sulphur content.

In this case the hygroscopic or water-absorbing material which may, for instance, be a solution of calcium chloride will first be brought into contact with purified gas, then into contact with gas which is to be subjected to treatment in order to effect a reduction in its content of sulphur and thereafter treated in order to adjust its concentration and to restore it in a condition in which it may be used in treating further quantities of purified gas to be delivered to the supply mains or gas holders optionally after further treatment to remove water.

In bringing the hygroscopic or water-absorbing material in a liquid state into contact with the heated gas its temperature will normally be raised and consequently by exposure freely to the atmosphere evaporation of the water which it has taken up will take place readily and in consequence of the spontaneous evaporation of the water its temperature will be lowered. Such lowering of temperature may be sufficient to enable it to be used without further cooling in the treatment of purified fuel gas, that is to say, gas which has been treated in order to effect a reduction in its sulphur content. Should, however, further cooling be desirable it may be effected in any suitable way, the whole quantity of the material which is brought into contact with the purified gas being cooled or, alternatively, a proportion of it may be cooled.

In this case, through the apparatus in which the gas is subjected to its final treatment with the hygroscopic or water-absorbing material in the liquid state, a main or auxiliary circulatory system may be provided, the auxiliary circulatory system being designed merely to secure cooling while the main circulatory system is arranged to secure the re-treatment of the hygroscopic or water-absorbing material in order to expel from it the water which it has taken up from the gas.

Any suitable apparatus for bringing gas and liquids into intimate contact may be employed in carrying the invention into effect. Thus, for instance, tower scrubbers, mechanical gas washers, and the like, may be used.

The invention will be described further in detail by way of example with reference to the accompanying drawing illustrating diagrammatically one construction of apparatus for carrying out the process in accordance with the invention.

In the construction illustrated, a gas dryer 1 in the form of a scrubbing tower is formed with an inlet 2 adjacent to its base, an outlet 3 formed adjacent to its upper extremity, a distributor device 4 associated with its upper portion adapted to deliver liquid down the tower, and a draining pipe 5 connected with its base adapted to deliver scrubbing liquid collected therein to a reservoir indicated by the reference numeral 6.

The distributor device 4 is connected by means of the pipe 13 with the cooler 14, which is provided with an inlet pipe 15 connected with a pump 16, the inlet pipe 17 of which dips into the tank 6.

For effecting evaporation where necessary of a desired portion of the scrubbing liquid, the evaporator 20, having an outlet 21 opening into the tank 6, is provided, the inlet of the evaporator being connected through the valve 22 with the pipe 13.

The outlet 3 of the gas dryer 1 is connected by the pipe 23 with the base of the liquid purifier 24 with which is associated a liquid distributor 25 supplied with other purifying liquid by way of the pipe 26. This tower is also provided with a pipe 27 adapted to lead gases therefrom to the oxide purifiers 28.

The operation of the construction illustrated is as follows:—

Gas is admitted to the gas dryer 1 through the inlet 2 thereof and is therein subjected in conditions such that its temperature will not be reduced below 35° to 40° C. or thereabouts to the action of a solution of calcium chloride of approximately 45 per cent strength, i. e. specific gravity 1.45, which is pumped up from the tank 6 by means of the pump 16 through the cooler 14 to the distributor 4, the liquid being returned to the reservoir 6 through the pipe 5, concentration of the liquid which has been diluted by the absorption of water from the gas being effected by means of the evaporator 20, to which a desired proportion of the liquid may be admitted through the valve 22, concentrated liquid being returned to the reservoir 6 through the pipe 21. The gas after scrubbing in the gas dryer 1 then passes through the outlet 3 and the pipe 23 and is introduced into the base of the tower 24 at a temperature of 35° to 40° C. where it is subjected to the action of a solution of sodium carbonate and metallic oxide solution at that temperature introduced into the tower through the distributing device 25, the treated gas being led by the pipe 27 to the oxide purifiers 28.

Having now described our invention, what we claim as new and desire to secure by Letters Patent is:—

The process of treating fuel gases which comprises subjecting the same to the action of water-absorbing bodies in the liquid state at a temperature not materially below 35° to 40° C. whereby the humidity of the gas at such temperature will be reduced below 100 per cent saturation and thereafter treating such gases with known aqueous reagents adapted to effect removal of sulphur from the gas.

In testimony whereof we have signed our names to this specification.

SYDNEY GRANGE WATSON.
DANIEL MAYON HENSHAW.